(12) United States Patent
Tang et al.

(10) Patent No.: US 7,906,876 B2
(45) Date of Patent: Mar. 15, 2011

(54) LINEAR SYNCHRONOUS MOTOR

(75) Inventors: Yuqi Tang, Tokyo (JP); Satoshi Sugita, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 89 days.

(21) Appl. No.: 12/537,496

(22) Filed: Aug. 7, 2009

(65) Prior Publication Data
US 2010/0033032 A1 Feb. 11, 2010

(30) Foreign Application Priority Data

Aug. 8, 2008 (JP) ................................. 2008-205688
Jun. 22, 2009 (JP) ................................. 2009-147901

(51) Int. Cl.
*H02K 41/02* (2006.01)
(52) U.S. Cl. ...................................... 310/12.18; 310/15
(58) Field of Classification Search .... 310/12.01–12.33, 310/15
See application file for complete search history.

(56) References Cited

U.S. PATENT DOCUMENTS

| 6,329,728 | B1 * | 12/2001 | Kitazawa et al. | 310/14 |
| 7,378,763 | B2 * | 5/2008 | Jack et al. | 310/12.06 |
| 7,501,724 | B2 * | 3/2009 | Tang et al. | 310/12.19 |

FOREIGN PATENT DOCUMENTS

JP 2001-286122 10/2001

\* cited by examiner

*Primary Examiner* — Nguyen N Hanh
(74) *Attorney, Agent, or Firm* — Rankin, Hill & Clark LLP

(57) ABSTRACT

A first pair of connected portions of one end magnetic pole portion, a first pair of connected portions of an end bracket, a first pair of connected portions of the other end magnetic pole portion, and a first pair of connected portions of each of five magnetic pole portions are connected by a pair of magnetic cylindrical members. A second pair of one connected portions of one end magnetic pole portion, a second pair of the other end magnetic pole portion, and a second pair of connected portions of each of five magnetic pole portions are connected by a pair of magnetic conductive parts. One pair of guide shafts are slidably fitted into the one pair of magnetic cylindrical members through linear bearings. A yoke is constituted from the one pair of magnetic cylindrical members and one pair of magnetic conductive parts. The five magnetic pole portions are each formed by laminating a plurality of magnetic steel plates in the axial direction.

8 Claims, 6 Drawing Sheets

LINEAR SYNCHRONOUS MOTOR

BACKGROUND OF THE INVENTION

1. Field of the Invention

The present invention relates to a linear synchronous motor in which a mover linearly moves relative to a stator.

2. Description of the Related Art

Japanese Patent Application Publication No. 2001-286122 (JP2001-286122A) discloses a linear synchronous motor comprising a stator and a mover that linearly moves relative to the stator. The mover includes a direct drive shaft reciprocating in an axial direction and an array of permanent magnets or a permanent magnet array including a plurality of permanent magnets fixed to the direct drive shaft. The stator includes a plurality of annular windings and a stator core unit having formed a slot for receiving each of the plurality of annular windings. The annular windings are each formed of an annularly wound winding conductor and are disposed so as to enclose the mover. The stator core unit is constituted from a plurality of stator core divided bodies assembled with each other in the axial direction. The stator core divided bodies are formed by cutting work, and each include a magnetic pole portion facing the permanent magnet array of the mover and a yoke constituting portion which is combined with another stator core divided body so as to constitute a yoke magnetically connecting the magnetic pole portions. One annular winding is disposed between two adjacent magnetic pole portions.

Conventional linear synchronous motors have issues of high manufacturing cost of the stator and high magnetic loss. In order to cope with the issues, it has been proposed to form a plurality of stator core divided bodies by laminating magnetic steel plates. However, the configuration of the yoke which magnetically connects the stator core divided bodies will inevitably be complicated.

SUMMARY OF THE INVENTION

An object of the present invention is to provide a linear synchronous motor in which the manufacturing cost of a stator used therein can be reduced, and magnetic loss and iron loss can also be reduced.

Another object of the present invention is to provide a linear synchronous motor in which the configuration of a yoke used therein can be simplified.

Still another object of the present invention is to provide a linear synchronous motor in which a lubricant can readily be supplied to a linear bearing that supports a mover so as to allow the mover to reciprocate relative to the stator.

Yet another object of the present invention is to provide a linear synchronous motor in which one of connecting members can be prevented from falling toward a stator core unit even if the linear motor is installed such that a direct drive shaft vertically reciprocates.

A linear synchronous motor of the present invention comprises a mover including a direct drive shaft reciprocating in an axial direction and one or more arrays of permanent magnets or permanent magnet arrays mounted on the direct drive shaft; and a stator including a plurality of windings and a stator core unit. The one or more arrays of permanent magnets may be mounted directly or through a magnet mounting portion or the like on the direct drive shaft. The plurality of windings are formed of annularly wound winding conductor. The plurality of windings are disposed at a predetermined interval in the axial direction to enclose the direct drive shaft. The stator core unit includes a plurality of magnetic pole portions and a yoke magnetically connecting the magnetic pole portions. The magnetic pole portions each have a magnetic pole surface that is opposed to the arrays of permanent magnets of the mover with a gap therebetween. The magnetic pole portions are disposed to enclose the direct drive shaft concentrically with the direct drive shaft and also disposed at a predetermined interval in the axial direction to define a space to allow one winding to be interposed between two adjacent magnetic pole portions.

In the present invention, the magnetic pole portions each have one or more connected portions. A majority or all of the magnetic pole portions are formed of magnetic steel plates of a predetermined shape that are laminated in the axial direction. The one or more connected portions of the magnetic pole portions are disposed along the direct drive shaft to form one or more connected portion arrays. The yoke is constituted from one or more yoke assemblies formed of a magnetic conductive material. The yoke assembly mechanically and magnetically connects the connected portions of the one or more connected portion arrays.

More specifically, in the linear synchronous motor according to the present invention, the magnetic pole portions each have one or more pairs of connected portions. A majority or all of the magnetic pole portions are formed of magnetic steel plates of a predetermined shape that are laminated in the axial direction. One or more pairs of connected portions of the magnetic pole portions are disposed along the direct drive shaft to form one or more pairs of connected portion arrays. The term "a majority of the magnetic pole portions" typically refers to magnetic pole portions (intermediate magnetic pole portions, etc.) except for the end magnetic pole portions located at both ends of the direct drive shaft in the axial direction thereof. The yoke is integrally constituted from one or more pairs of yoke assemblies formed of a magnetic conductive material. The one or more pairs of yoke assemblies mechanically and magnetically connect the connected portions of the one or more pairs of connected portion arrays. The term "a magnetic conductive material" refers to a magnetic material that may form a flux path.

In the present invention, the magnetic pole portions and the yoke are separately formed, and a majority or all of the magnetic pole portions are each formed by laminating a plurality of magnetic steel plates. Conventionally, all of the magnetic pole portions are formed by cutting the magnetic material. Compared therewith, the manufacturing cost of the stator can be reduced according to the present invention. Further, magnetic loss and iron loss occurring in the stator core unit can be reduced. Even if a majority or all of the magnetic pole portions are each formed by laminating a plurality of magnetic steel plates, the configuration of the yoke magnetically connecting the magnetic pole portions can be simplified since one or more pairs of connected portions (first pair of connected portions or second pair of connected portions) are provided in the magnetic pole portions and the yoke is constituted from one or more pairs of yoke assemblies connected to the one or more pairs of connected portions. Further, the yoke is integrally formed of a magnetic conductive material. This configuration also reduces the magnetic loss.

If a majority of the magnetic pole portions are each formed by laminating a plurality of magnetic steel plates, two magnetic pole portions located at both ends in the axial direction may be formed by cutting a magnetic conductive plate material. In this case, the yoke assemblies can be fixed to the two magnetic pole portions located at both sides in the axial direction, for example, using screws. With this, the yoke assemblies may securely be fixed mechanically onto the stator core unit.

Preferably, the first pair of connected portion arrays may be disposed apart from each other by a mechanical angle of 180° relative to the direct drive shaft and the second pair of connected portion arrays may be disposed apart from each other by a mechanical angle of 180° relative to the direct drive shaft and apart from the first pair of connected portion arrays by a mechanical angle of 90°. The first pair of yoke assemblies may preferably be constituted from one pair of magnetic cylindrical members that respectively connect the first pair of connected portions of the first pair of connected portion arrays. In this configuration, it is preferable that a linear bearing be disposed inside each magnetic cylindrical member in the pair, that one pair of guide shafts be slidably fitted into the one pair of magnetic cylindrical members via the linear bearings, and that both ends of the direct drive shaft and both ends of the one pair of guide shafts be respectively connected to one pair of connecting members. The term "linear bearing" used herein refers to a bearing, such as a linear guide, that supports a shaft member so as to allow the shaft member to reciprocate relative to a supported portion in the axial direction of the shaft member. This configuration eliminates the need of supporting the direct drive shaft at both ends of the stator core unit, thereby reducing the length of the linear synchronous motor as measured in the axial direction, as compared to conventional linear synchronous motors. Further, the one pair of guide shafts of the mover are slidably supported by the one pair of magnetic cylindrical members (pair of yoke assemblies) disposed apart from the direct drive shaft. That is, the mover can be supported at a position apart from the direct drive shaft so as to reciprocate relative to the stator. As a result, when a lubricant is supplied to the linear bearings that support the mover, the lubricant does not adhere to the magnetic pole surfaces of the magnetic pole portions or members around the direct drive shaft. Further, the one pair of magnetic cylindrical members that connect the plurality of first connected portions are used to support the one pair of guide shafts. That is, the pair of magnetic cylindrical members serve both as the yoke assembly and supporting member for supporting the guide shafts. Therefore, the number of parts for supporting the one pair of guide shafts can be reduced.

The second pair of yoke assemblies are constituted from one pair of magnetic conductive parts each formed of a magnetic conductive plate with a plurality fitting grooves formed therein. The fitting grooves are fitted with the second pair of connected portions of the second pair of connected portion arrays. In this configuration, the one pair of magnetic conductive parts are mechanically connected to the stator core unit with the second pair of connected portions being fitted in the fitting grooves. With this configuration, the gap dimension between each of the magnetic pole portions is determined by the pitch of the fitting grooves formed in the magnetic conductive part. As a result, by appropriately setting the pitch of the fitting grooves, the magnetic pole portions may easily and correctly be positioned.

A spring mechanism may preferably be disposed between one connecting member in the pair and the stator core unit to bias the one connecting member in a direction apart from the stator core unit when the one connecting member approaches the stator core unit. Thus, if the linear synchronous motor is installed such that the direct drive shaft vertically reciprocates and one connecting member is located in an upper position, a biasing force of the spring member will prevent the one connecting member from falling toward the stator core unit.

The linear baring includes one pair of split linear bearings disposed apart in the axial direction of the guide shaft. With this configuration, the guide shaft can reliably be supported by the one pair of split linear bearings disposed apart in the axial direction of the guide shaft.

DESCRIPTION OF THE PREFERRED EMBODIMENTS

Figure 1:
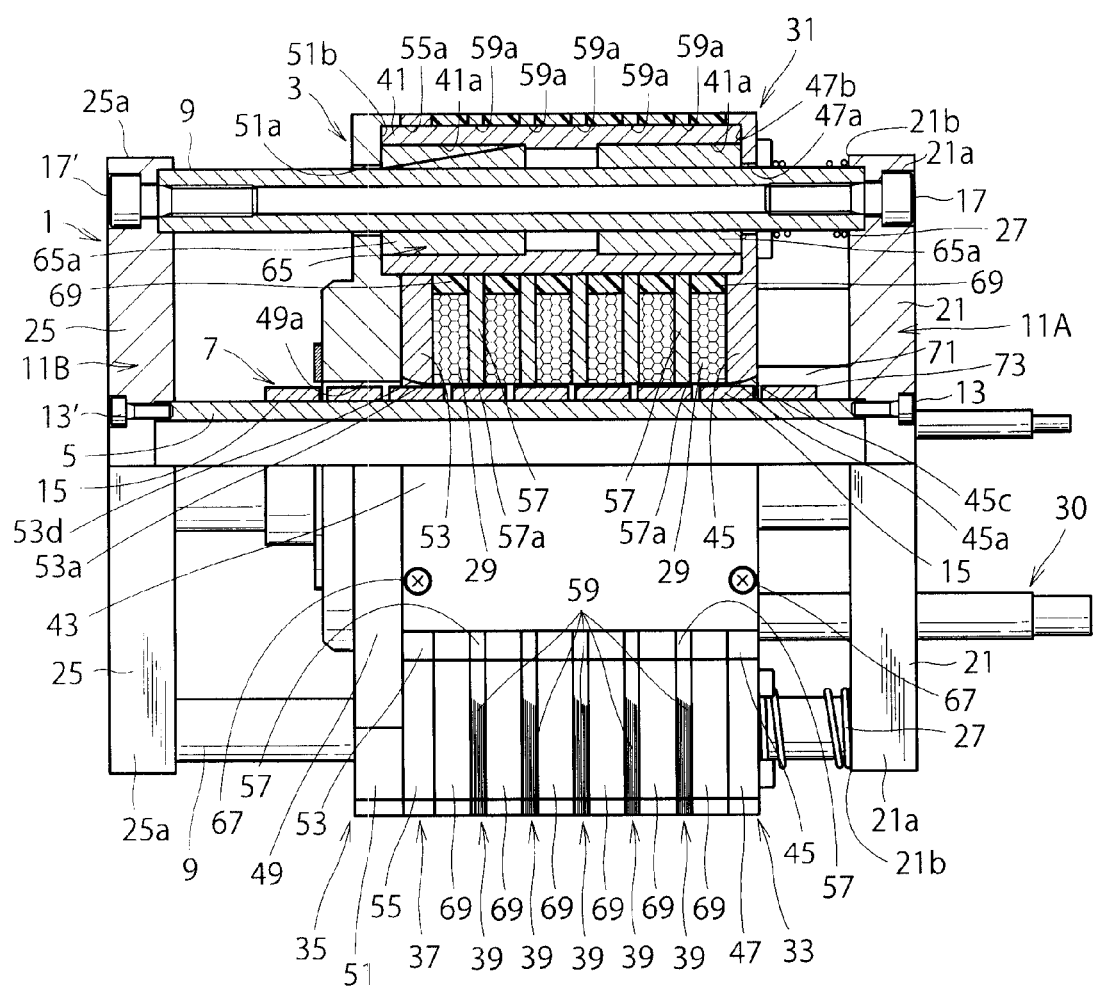
FIG. 1 is a partly cut-away front view of a linear synchronous motor according to an embodiment of the present invention.
Figure 2:
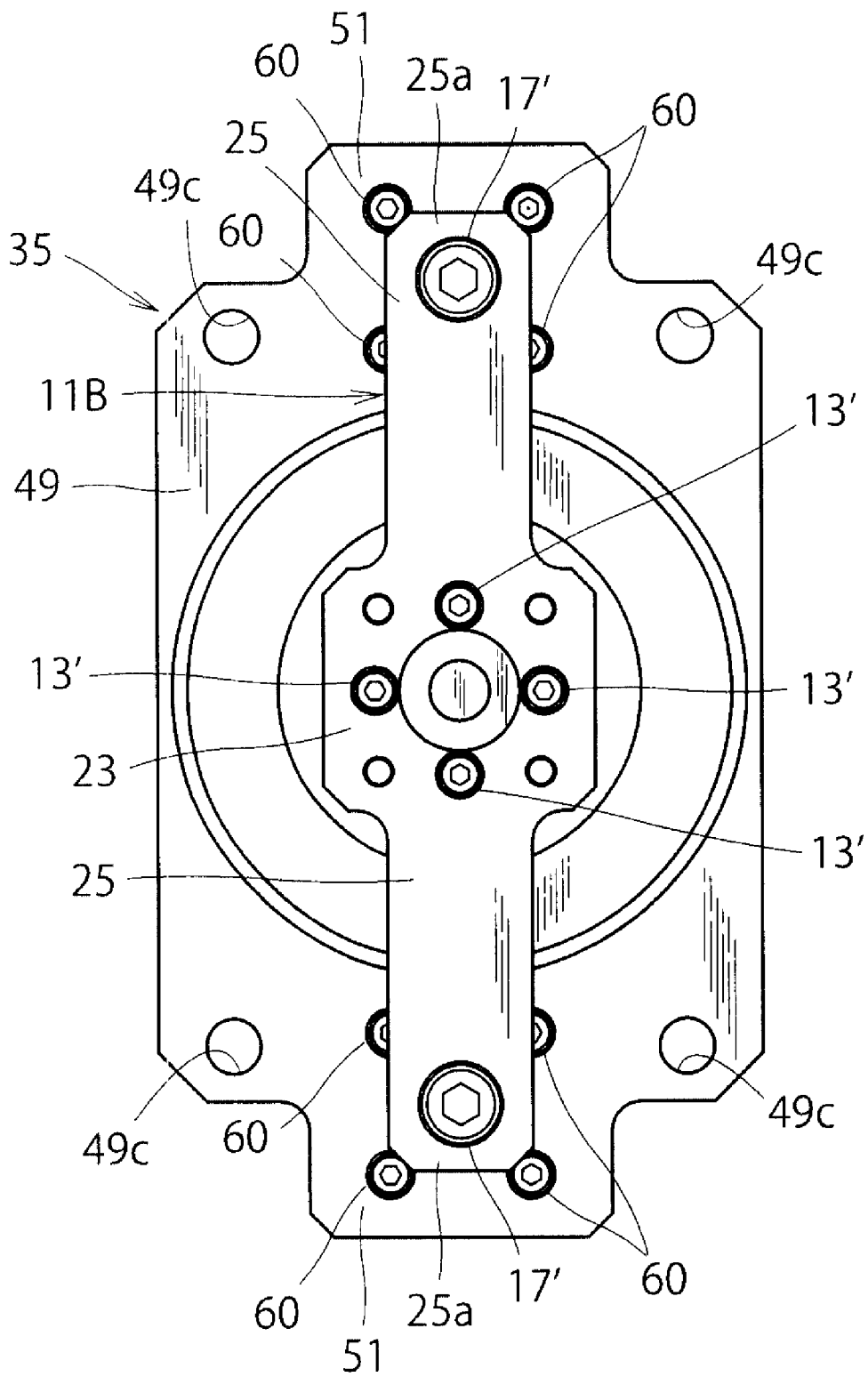
FIG. 2 is a left side view of the linear synchronous motor of FIG. 1.
Figure 3:
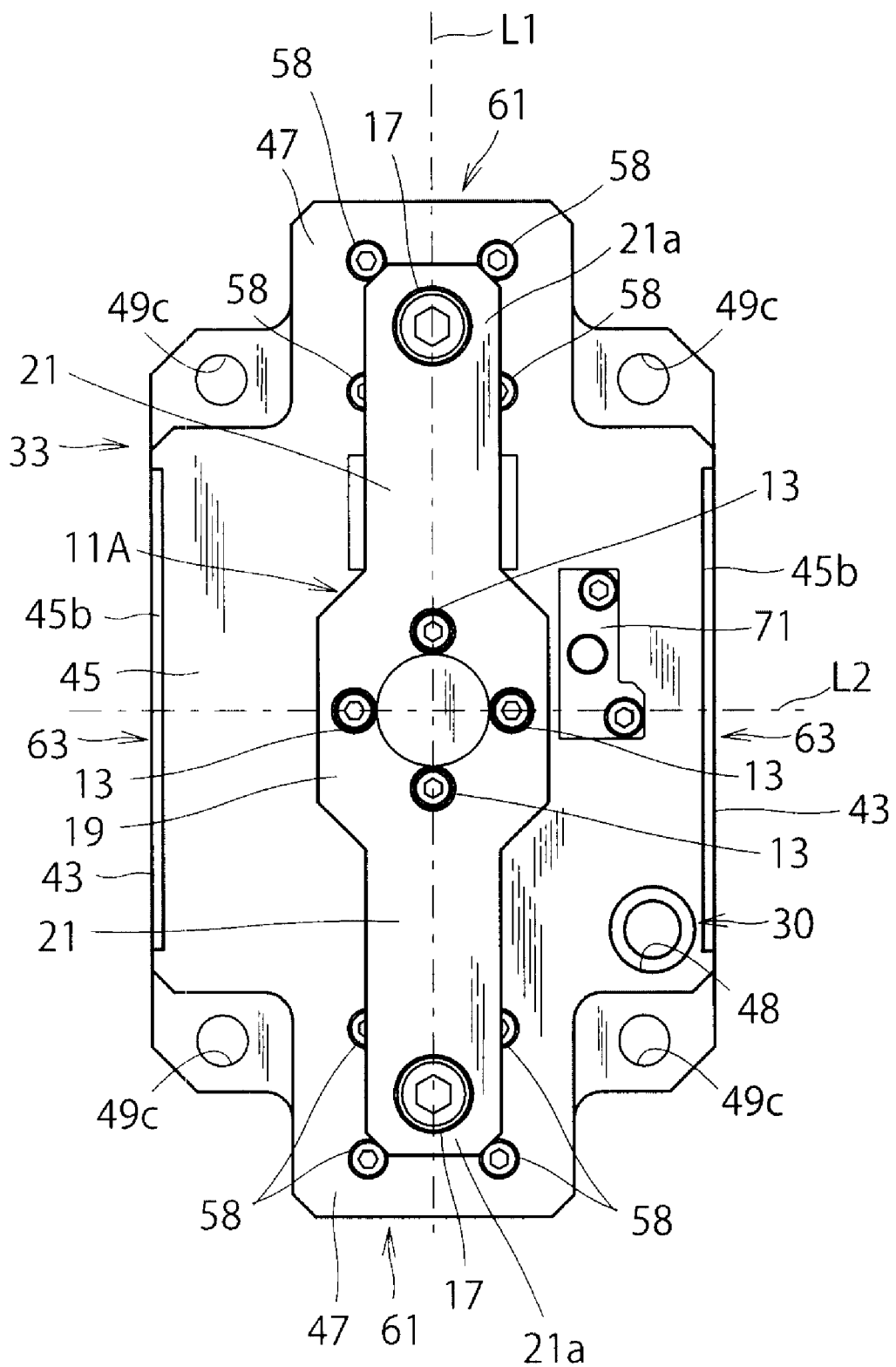
FIG. 3 is a right side view of the linear synchronous motor of FIG. 1.

An embodiment of the present invention will be described in detail hereinbelow with reference to accompanying drawings. FIGS. 1, 2, and 3 are respectively front, left side, and right side views of a linear synchronous motor according to the embodiment of the present invention. FIG. 1 shows the linear synchronous motor that has partially been sectioned for clarity in the angular range of 90° about the axial line of a direct drive shaft 5. As shown in FIG. 1, the linear synchronous motor comprises a mover 1 and a stator 3. The mover 1 includes a direct drive shaft 5, a permanent magnet array 7 or an array of permanent magnets, a pair of guide shafts 9, a pair of connecting members 11A and 11B, and a permanent magnet 73 to be detected. The direct drive shaft 5 has an elongated cylindrical shape and is configured to reciprocate in the axial direction thereof. The permanent magnet array 7 is constituted from eight annular-shaped permanent magnets 15 fitted with the outer periphery of the direct drive shaft 5 and arranged in the axial direction of the direct drive shaft 5. Four annular-shaped permanent magnets of the eight permanent magnets 15 are magnetized such that N-pole appears on a radially outer surface of the direct drive shaft 5, and other four annular-shaped permanent magnets are magnetized such that S-pole appears on the radially outer surface of the direct drive shaft 5. The eight permanent magnets are arranged such that the N-pole and S-pole alternately appear in the axial direction. In the present embodiment, one permanent magnet 15 is constituted from six circular arc-shaped permanent magnet pieces arranged in the peripheral direction of the direct drive shaft 5. The permanent magnet pieces are fixed to the direct drive shaft 5 by an adhesive. Alternatively, a heat shrinkable tube may be fitted on the outside of the direct drive shaft 5 on which the eight permanent magnets 15 have been mounted and heated so as to be shrunk for entirely wrapping the permanent magnets 15. The permanent magnets may be mounted directly on the outer periphery of the direct drive shaft 5 as with this embodiment, or may be mounted indirectly thereon. For example, a configuration may be employed in which a magnet mounting portion is fixed to the outer periphery of the direct drive shaft 5 and then the permanent magnet array (plurality of permanent magnets) is fixed to the magnet mounting portion.

The pair of guide shafts 9 each have an elongated cylindrical shape. The pair of guide shafts 9 are disposed so as to extend in parallel to the direct drive shaft 5 and connected thereto through the pair of connecting members 11A and 11B. The pair of guide shafts 9 are each slidably supported by a linear bearing 65 provided in each of a pair of magnetic cylindrical members 41 to be described later. A configuration allowing the pair of guide shafts 9 to slide in the pair of magnetic cylindrical members 41 will be described in detail later.

As shown in FIG. 3, one connecting member 11A of the pair of connecting members 11A, 11B integrally includes a center portion 19 and two rectangular extended portions 21 extending from the center portion 19 in the vertical direction on the paper of FIG. 3. One end portion of the direct drive shaft 5 is connected to the center portion 19 by four screws 13. The end portions, located on one end, of the pair of guide shafts 9 are connected to end portions 21a of the two extended portions 21 by screws 17. As shown in FIG. 2, the connecting member 11B integrally includes a center portion 23 and two rectangular extended portions 25 extending from the center portion 23 in the vertical direction on the paper of FIG. 2. The other end portion of the direct drive shaft 5 is connected to the center portion 23 by four screws 13'. The end portions, located on the other end, of the pair of guide shafts 9 are connected to end portions 25a of the two extended portions 25 by screws 17'.

As shown in FIG. 1, an opposed surface 21b that is opposed to a stator core unit 31 to be described later is formed at both end portions 21a of the extended portions 21 of the connecting member 11A. Further, a pair of coil springs 27 constituting a spring mechanism are disposed between the opposed surface 21b of the connecting member 11A and the stator core unit 31. When the connecting member 11A approaches the stator core unit 31, the pair of coil springs 27 exert a biasing force in a direction that the connecting member 11A is spaced away from the stator core unit 13. Thus, if the linear synchronous motor is installed such that the direct drive shaft 5 vertically reciprocates and the connecting member 11A is located in an upper position, a biasing force of the coil springs 27 will prevent the connecting member 11A from falling toward the stator core unit 31 side.

The stator 3 includes six annular windings 29 and a stator core unit 31. The six annular windings 29 are formed of annularly wound winding conductor and disposed at a predetermined interval in the axial direction of the direct drive shaft 5 so as to enclose the direct drive shaft 5.

The stator core unit 31 includes an end bracket 35, a pair of end magnetic pole portions 33 and 37, five intermediate magnetic pole portions 39, a pair of magnetic cylindrical members 41, and a pair of magnetic conductive parts 43. In the present embodiment, the pair of end magnetic pole portions 33 and 37 and five intermediate magnetic pole portions 39 constitute a plurality of magnetic pole portions. As shown in FIG. 3, the end magnetic pole portion 33 includes a substantially rectangular main body portion 45 and a first pair of connected portions 47 positioned above and below the main body portion 45 on the paper of FIG. 3. The end magnetic pole portion 33 is formed by cutting magnetic steel having a predetermined thickness. As shown in FIG. 1, a through-hole 45a through which the direct drive shaft 5 passes is formed in the center portion of the main body portion 45. Concave portions 45b constituting a second pair of connected portions are formed on the left and right sides of the main body portion 45 on the paper of FIG. 3 so as to be opened outwardly in a direction perpendicular both to the axial direction and a direction that the first pair of connected portions 47 face each other. As described above, the first pair of connected portions 47 face each other with respect to the direct drive shaft 5, and the second pair of connected portions (concave portion 45b) also face each other with respect to the direct drive shaft 5. In the present embodiment, the end magnetic pole portion 33 constitutes a magnetic pole portion positioned at one end of the direct drive shaft 5 in the axial direction. Thus, as shown in FIG. 1, the inner peripheral wall surface of the through-hole 45a forms a magnetic pole surface 45c. The magnetic pole surface 45c is formed such that a gap between the magnetic pole surface 45c and permanent magnet array 7 becomes larger distally in the axial direction from the adjacent intermediate magnetic pole portions. A through-hole 47a through which each of the pair of guide shafts 9 passes is formed in the center portion of each of the first pair of connected portions 47. Further, an annular concave portion 47b is formed concentrically with the through-hole 47a in each of the first pair of connected portions 47 so as to be opened toward the end bracket 35. One end of each magnetic cylindrical member 41 in the pair is fitted into the concave portion 47b. As shown in FIG. 3, a through-hole 48 is formed in the end magnetic pole portion 33. A lead wire bundle 30, constituted by lead wires of a plurality of annular excitation windings arranged in a bundle, passes through the through-hole 48. A hall element 71 is fixed to the outer surface of the end magnetic pole portion 33.

As shown in FIG. 2, the end bracket 35 includes a substantially rectangular main body portion 49 and a first pair of connected portions 51 positioned above and below the main body portion 49 on the paper of FIG. 2. The end bracket 35 is formed by cutting a non-magnetic material made of aluminum, for example. As shown in FIG. 1, a through-hole 49a, through which the direct drive shaft 5 passes, is formed in the center portion of the main body portion 49. Accordingly, the first pair of connected portions 51 face each other with respect to the direct drive shaft 5. Further, as shown in FIG. 2, mount through-holes 49c are formed at four corners of the main body portion 49. As shown in FIG. 1, a through-hole 51a, through which each guide shaft 9 in the pair passes, is formed in the center portion of each connected portion 51 in the first pair. Further, an annular concave portion 51b is formed concentrically with the through-hole 51a in each connected portion 51 in the first pair so as to be opened toward the end magnetic pole portion 33. One end of each magnetic cylindrical member 41 in the pair is fitted into the concave portion 51b.

Figure 4:
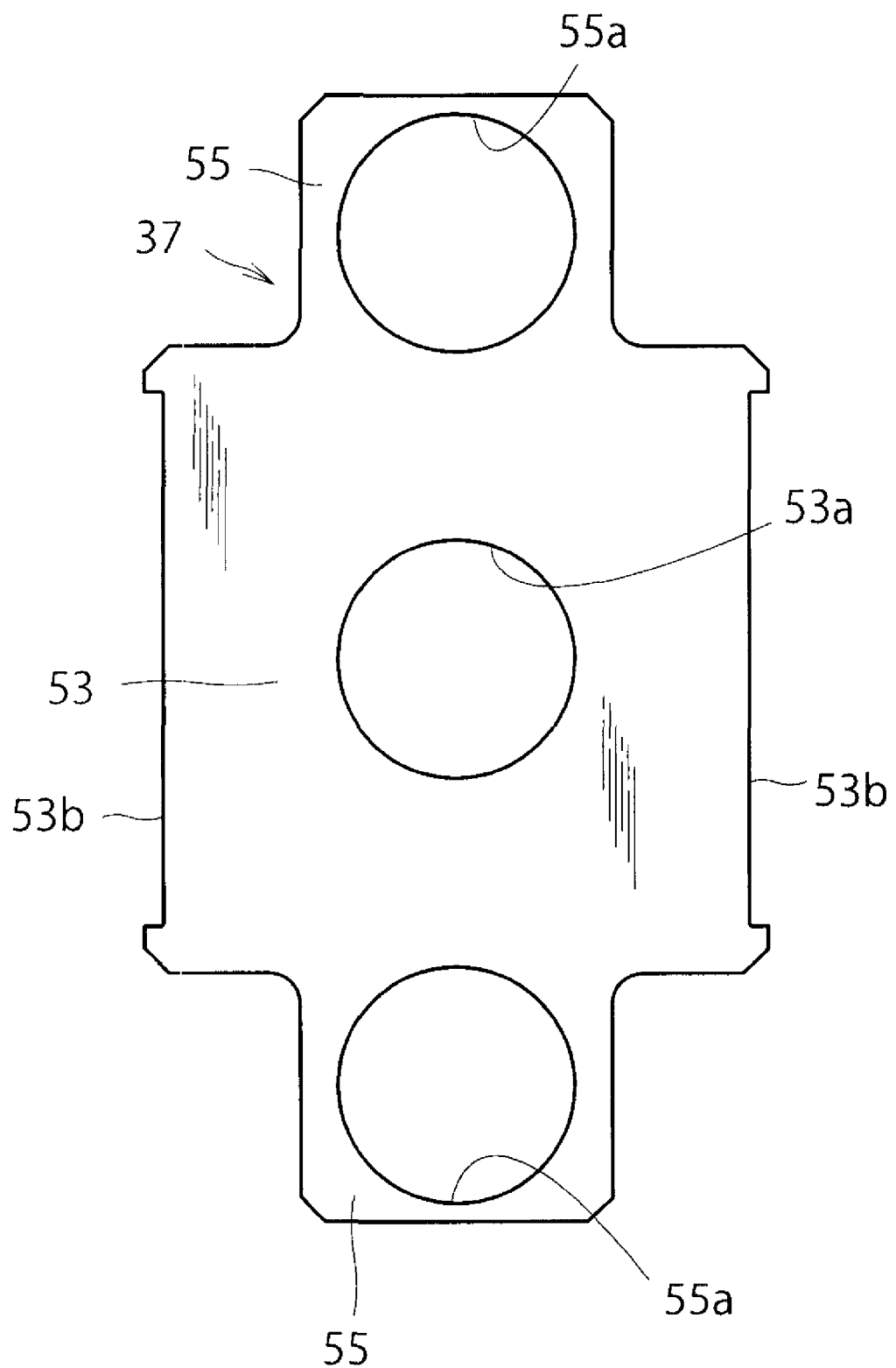
FIG. 4 is a plan view of an end magnetic pole portion of the linear synchronous motor of FIG. 1.

As shown in FIG. 4, the end magnetic pole portion 37 adjacent to the end bracket 35 has a substantially rectangular main body portion 53, and a first pair of connected portions 55 positioned above and below the main body portion 53 on the paper of FIG. 4. Like the end magnetic pole portion 33, the end magnetic pole portion 37 is formed by cutting magnetic steel. As shown in FIG. 1, a through-hole 53a, through which the direct drive shaft 5 passes, is formed in the center potion of the main body portion 53. Concave portions 53b constituting a second pair of connected portions are formed on the left and right sides of the main body portion 53 on the paper of FIG. 4 so as to be opened outwardly in a direction perpendicular both to the axial direction and a direction that the first pair of connected portions 55 face each other. As described above, the first pair of connected portions 55 face each other with respect to the direct drive shaft 5, and the second pair of connected portions (concave portion 53b) also face each other with respect to the direct drive shaft 5. In the present embodiment, the end magnetic pole portion 37 constitutes a magnetic pole portion positioned at the other end of the direct drive shaft 5 in the axial direction. Thus, as shown in FIG. 1, the inner peripheral wall surface of the through-hole 53a forms a magnetic pole surface 53d. The magnetic pole surface 53d is formed such that a gap between the magnetic pole surface 53d and permanent magnet array 7 becomes larger distally in the axial direction from the adjacent intermediate magnetic pole portions. A through-hole 55a, through which each magnetic cylindrical member 41 in the pair passes, is formed in the center portion of each connected portion 55 in the first pair.

Figure 5:
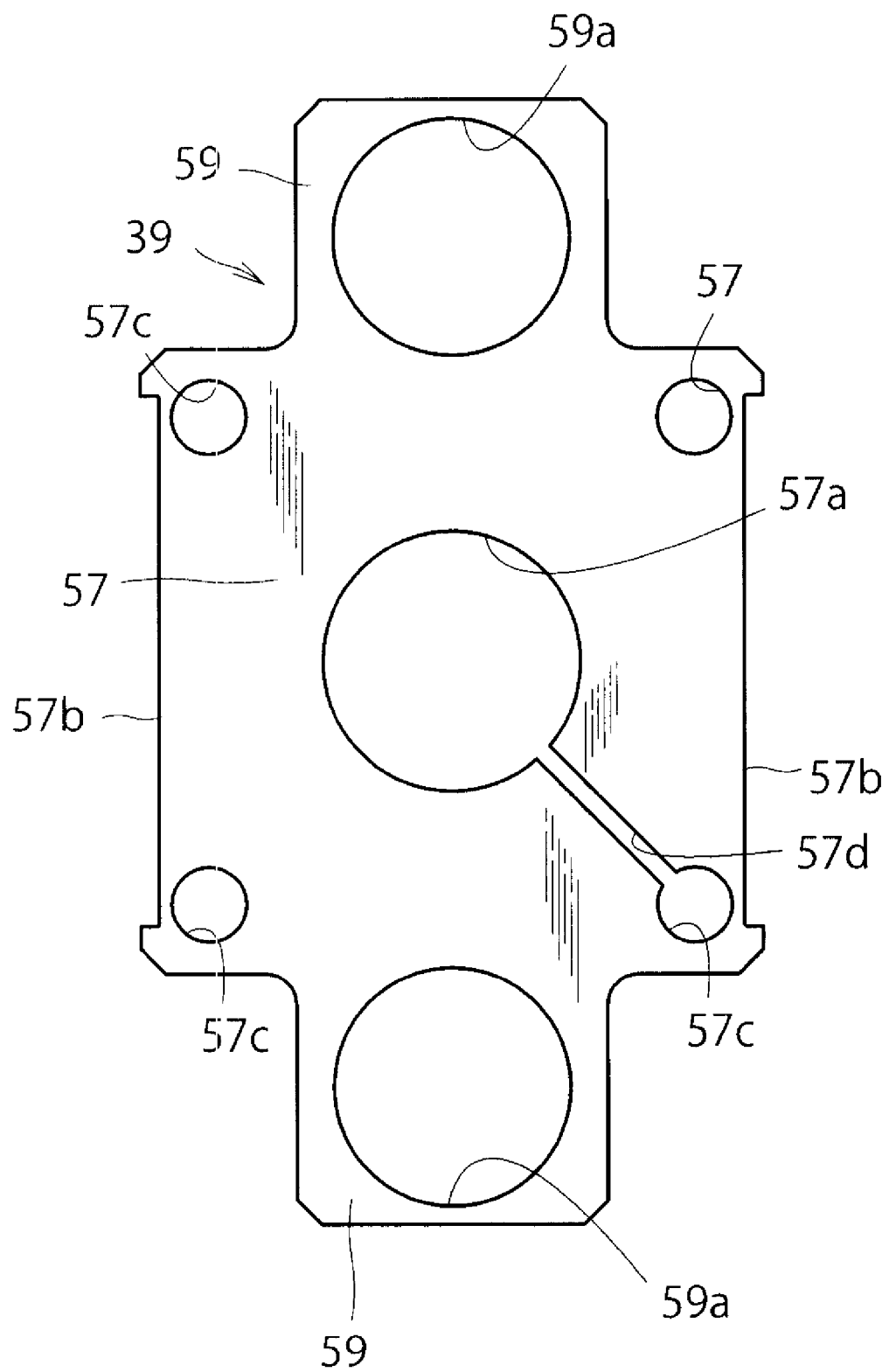
FIG. 5 is a plan view of a magnetic pole portion of the linear synchronous motor of FIG. 1.

As shown in FIG. 5, each of the five intermediate magnetic pole portions 39 includes a substantially rectangular main body portion 57 and a first pair of connected portions 59 positioned above and below the main body portion 57 on the paper of FIG. 5. Each of the intermediate magnetic pole portions 39 is formed by laminating a plurality of magnetic steel plates in the axial direction of the direct drive shaft 5. As shown in FIG. 1, the five intermediate magnetic pole portions 39 are arranged in the axial direction of the direct drive shaft 5 between the end magnetic pole portion 33 and the end magnetic pole portion 37. A through-hole 57a, through which the direct drive shaft 5 passes, is formed in the center portion of the main body portion 57. The inner peripheral surface of the through-hole 57a forms a magnetic pole surface which faces the permanent magnet array 7 of the mover 1 with a gap therebetween. Concave portions 57b constituting a second pair of connected portions are formed on the left and right sides of the main body portion 57 on the paper of FIG. 5 so as to so as to be opened outwardly in a direction perpendicular both to the axial direction and a direction that the first pair of connected portions 59 face each other. As described above, the first pair of connected portions 59 face each other with respect to the direct drive shaft 5, and the second pair of connected portions (concave portion 57b) also face each other with respect to the direct drive shaft 5. Further, resin through-holes 57c are formed at four corners of the main body portion 57. A bobbin fitting groove 57d into which a part of a bobbin is fitted is formed between the through-hole 57a and one resin through-hole 57c. The bobbin fitting hole 57d communicates with the through-hole 57a and extends outwardly in a direction apart from the through-hole 57a. A through-hole 59a, through which each of the pair of magnetic cylindrical members 41 passes, is formed in the center portion of each of the first pair of connected portions 59. In the present embodiment, the five intermediate magnetic pole portions 39 constitute a majority of the plurality of magnetic pole portions (33, 39, 37).

In the present embodiment, the end magnetic pole portion 33, five intermediate magnetic pole portions 39, and the end magnetic pole portion 37 are arranged spaced from one another in the axial direction so as to form a space in which one annular winding 29 is disposed between two adjacent magnetic pole portions (33, 39, 37).

With the end bracket 35, the end magnetic pole portions 33 and 37, the five intermediate magnetic pole portions 39, and the six annular windings 29 being assembled together, the first pair of connected portions 47 of the end magnetic pole portion 33, the first pair of connected portions 51 of the end bracket 35, the first pair of connected portions 55 of the end magnetic pole portion 37, and the first pair of connected portions 59 of each of the five intermediate magnetic pole portions 39 are arranged along the direct drive shaft 5 to constitute a first pair of connected portion arrays 61 (FIG. 3). Further, the second pair of connected portions (concave portions 45b) of the end magnetic pole portion 33, the second pair of connected portions (concave portions 53b) of the end magnetic pole portion 37, and the second pair of connected portions (concave portions 57b) of each of the five intermediate magnetic pole portions 39 are arranged along the direct drive shaft 5 to constitute a second pair of connected portion arrays 63 (FIG. 3). The first pair of connected portion arrays 61 exist on a virtual line L1 extending in the vertical direction with respect to the direct drive shaft 5 on the paper of FIG. 5.

As a result, the first pair of connected portion arrays 61 are positioned apart from each other by a mechanical angle of 180° relative to the direct drive shaft 5. Further, the second pair of connected portion arrays 63 exist on a virtual line L2 (perpendicular to the virtual line L1) extending in the horizontal direction with respect to the direct drive shaft 5 on the paper of FIG. 3. As a result, the second pair of connected portion arrays 63 are positioned apart from each other by a mechanical angle of 180° relative to the direct drive shaft 5 and positioned apart from the first pair of connected portion arrays 61 by a mechanical angle of 90°. The first pairs of connected portions (47, 51, 55, 59) constituting the first pair of connected portion arrays 61 are connected to one another by the pair of magnetic cylindrical members 41. More specifically, as shown in FIG. 1, the both ends of each magnetic cylindrical member 41 in the pair are fitted into the concave portion 47b of the end magnetic pole portion 33 and the concave portion 51b of the end bracket 35. The intermediate portion of each magnet cylindrical member 41 in the pair passes through the through-hole 55a of the end magnetic pole portion 37 and the through-hole 59a of each of the five intermediate magnetic pole portions 39. As shown in FIG. 3, one end of each of the magnetic cylindrical members 41 and the end magnetic pole portion 33 are fixed to each other by screws 58. Further, as shown in FIG. 2, the other end of each of the magnetic cylindrical members 41 and end bracket 35 are fixed to each other by screws 60. The pair of magnetic cylindrical members 41 are each integrally formed of a magnetic material and each have a cylindrical shape. As shown in FIG. 1, a linear bearing 65 is provided in each of the pair of magnetic cylindrical members 41. In the present embodiment, concave portions 41a are formed at both ends of the inner peripheral portions of each of the magnetic cylindrical members 41. Each of the concave portions 41a is opened radially inwardly and axially outwardly. A pair of split linear bearings 65a are fitted into the concave portions 41a. As a result, the pair of split linear bearings 65a are disposed apart from each other in the axial direction of the guide shaft 9 at the both end portions of one magnetic cylindrical member 41. The pair of guide shafts 9 of the mover 1 are slidably fitted in the pair of magnetic cylindrical members 41 through the linear bearings 65. With this supporting configuration, the direct drive shaft 5 of the mover 1 is positioned at the center of the through-hole (45a, 49a, or the like) formed in the center of the stator core unit 31.

Figure 6A:
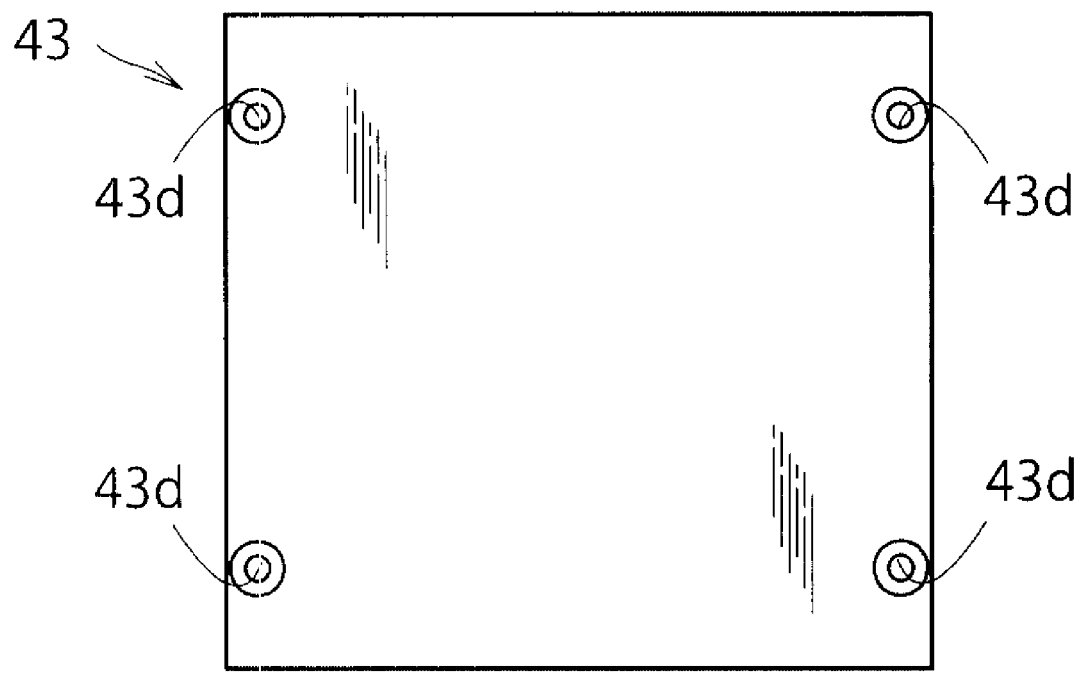
FIGS. 6A and 6B are plan and bottom views of a magnetic conductive part used in the linear synchronous motor of FIG. 1.
Figure 6B:
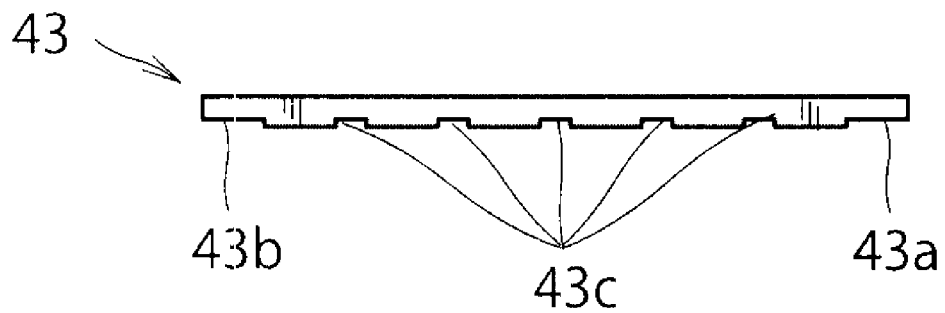

The second pairs of connected portions (45b, 53b, 57b) constituting the second pair of connected portion arrays 63 are connected to one another by the pair of magnetic conductive parts 43. As shown in FIGS. 6A and 6B, each magnetic conductive part 43 is made of a magnetic conductive plate having a plurality of fitting grooves 43a, 43b, and 43c formed therein. The concave portion 45b constituting the second connected portion of the end magnetic pole portion 33 is fitted into the groove 43a positioned at one end. The concave portion 53b constituting the second connected portion of the end magnetic pole portion 37 is fitted into the fitting groove 43b positioned at the other end. The concave portions 57b constituting the second connected portions of the five intermediate magnetic pole portions are fitted into the five fitting grooves 43c positioned at the intermediate portion. Through-holes 43d are formed at four corners of the magnetic conductive part 43. As shown in FIG. 1, the pair of magnetic conductive parts 43 are screw-fixed by screws 67, threaded through the though-holes 43d into screw holes formed in the end magnetic pole portion 33 and the end magnetic pole portion 37.

In the present embodiment, a first pair of yoke assemblies are constituted from the pair of magnetic cylindrical members 41, and a second pair of yoke assemblies are constituted from the pair of magnetic conductive parts 43. As a result, a yoke magnetically connecting the magnetic pole portions (33, 39, 37) is formed of the first and second pairs of yoke assemblies (41, 43).

Wit the pairs of end magnetic pole portions 33 and 37, the five intermediate magnetic pole portions 39, the pair of magnetic cylindrical members 41, the pair of magnetic conductive parts 43, and the six annular windings 29 being assembled together, one-liquid type thermosetting synthetic resin 69 is filled in portions between adjacent two magnetic pole portions (33, 39, 37) and in the radial direction outside of the six annular windings 29. The thermosetting synthetic resin 69 is also filled in the resin through-holes 57c of the five intermediate magnetic pole portions 39. In the present embodiment, the resin is filled as follows. First, the pairs of end magnetic pole portions 33 and 37, the five intermediate magnetic pole portions 39, the pair of magnetic cylindrical members 41, the pair of magnetic conductive parts 43, and the six annular windings 29 are assembled together. Thus, an assembly is obtained. Then, core materials are inserted into the through-holes (45a, 49a, etc.) at the center of the assembly. After the assembly, into which the core materials has been inserted, is placed in a mold, dissolved synthetic resin is filled into the assembly through an inlet port of the mold. Finally, after the synthetic resin has thermally been cured, the assembly is removed from the mold, followed by removal of the core materials. Thus filling of the synthetic resin 69 is completed.

In the present embodiment, as shown in FIGS. 1 and 3, the hall element 71 is fixed to the outer surface of the end magnetic pole portion 33 of the stator core unit 31, and permanent magnet 73 to be detected is fitted with the direct drive shaft 5 so as to face the hall element 71. The hall element 71 and the permanent magnet 73 to be detected are used to detect a magnetic pole.

In the linear synchronous motor of the present embodiment, when the direct drive shaft 5 reciprocates relative to the stator 3 in the axial direction thereof, the pair of guide shafts 9 connected to the direct drive shaft 5 through the pair of connecting members 11A and 11B is slid relative to the pair of magnetic cylindrical members 41 through the linear bearings 65.

In the linear synchronous motor of the present embodiment, the five intermediate magnetic pole portions 39 are each formed by laminating a plurality of magnetic steel plates. Accordingly, manufacturing cost of the stator can be reduced. Further, magnetic loss and iron loss occurring in the stator core unit can be reduced.

Further, the pair of magnetic cylindrical members 41 provided apart from the direct drive shaft 5 supports the mover 1 so as to allow the mover 1 to reciprocate relative to the stator. When a lubricant is supplied to the linear bearings 65 that support the mover 1, the lubricant does not adhere to the magnetic pole surfaces of the magnetic pole portions (33, 39, 37) or members around the direct drive shaft. Further, the pair of magnetic cylindrical members 41 that connect the plurality of first connected portions (47, 51, 55, 59) are used to support the pair of guide shafts 9. That is, the pair of magnetic cylindrical members 41 serve both as the yoke assembly and supporting member for supporting the guide shafts 9. Therefore, the number of parts for supporting the pair of guide shafts 9 can be reduced.

In the present embodiment, a majority (five magnetic pole portions 39) of the magnetic pole portions are each formed by laminating a plurality of magnetic steel plates in the axial direction in the present embodiment. Alternatively, all of the magnetic pole portions may each be formed by laminating a plurality of magnetic steel plates in the axial direction.

Further, in this embodiment, although the first pair of connected portions (47, 51, 55, 59) are opposed to each other with respect to the direct drive shaft 5, and second pair of connected portions (45b, 53b, 57b) are opposed to each other also with respect to the direct drive shaft 5, the positions of the first and second pairs of connected portions may be suitably determined. For example, the first pair of connected portions may be arranged at the outer peripheral portion of the stator core unit without facing each other. The second pair of connected portions may be arranged at the outer peripheral portion of the stator core unit without facing each other.

Further, although the pair of connected portions include two pairs of connected portions [first pair of connected portions (47, 51, 55, 59) and second pair of connected portions (45b, 53b, 57b)], it is sufficient to provide one or more pairs of connected portions, and it is sufficient to provide only one pair of connected portions.

Further, one or more or only one connected portion may be provided.

According to the present invention, a plurality of magnetic pole portions and the yoke are separately formed, and a majority or all of the magnetic pole portions are each formed by laminating a plurality of magnetic steel plates. Accordingly, manufacturing cost of the stator can be reduced. Further, magnetic loss and iron loss occurring in the stator core unit can be reduced more than ever before.

Further, the mover is supported at the position apart from the direct drive shaft so as to reciprocate relative to the stator. Therefore, when a lubricant is supplied to the linear bearings that support the mover, the lubricant does not adhere to the magnetic pole surfaces of the magnetic pole portions or members around the direct drive shaft.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A linear synchronous motor comprising:
  a mover including:
    a direct drive shaft reciprocating in an axial direction, and
    one or more arrays of permanent magnets mounted on the direct drive shaft; and
  a stator including:
    a plurality of windings disposed at a predetermined interval in the axial direction to enclose the direct drive shaft, and
    a stator core unit including:
      a plurality of magnetic pole portions disposed to enclose the direct drive shaft concentrically with the direct drive shaft and also disposed at a predetermined interval in the axial direction to define a space to allow one winding to be interposed between two adjacent magnetic pole portions, and
      a yoke magnetically connecting the magnetic pole portions;
      a majority or all of the magnetic pole portions being formed of magnetic steel plates of a predetermined shape that are laminated in the axial direction,
      the magnetic pole portions each having one or more connected portions, the connected portions of magnetic pole portions being disposed along the direct drive shaft to form one or more connected portion arrays; and the yoke being constituted from one or more yoke assemblies formed of a magnetic conductive material, the one or more yoke assemblies mechanically and magnetically connecting the connected portions of the one or more connected portion arrays.

2. The linear synchronous motor according to claim 1, wherein two of the magnetic pole portions located at both ends in the axial direction are formed by cutting a magnetic conductive plate material; and the yoke is fixed onto the two magnetic pole portions located at both ends in the axial direction.

3. The linear synchronous motor according to the claim 1, wherein the one or more connected portions are constituted from one or more pairs of connected portions;

the one or more connected portion arrays are constituted from one or more pairs of connected portion arrays; and the yoke is constituted from one or more pairs of yoke assemblies, the one or more pairs of yoke assemblies mechanically and magnetically connecting the connected portions of the one or more pairs of connected portion arrays.

4. The linear synchronous motor according to claim 3, wherein the one or more pairs of connected portions include a first pair of connected portions and a second pair of connected portions;

the one or more pairs of connected portion arrays include a first pair of connected portion arrays and a second pair of connected portions arrays;

the one or more pairs of yoke assemblies include a first pair of yoke assemblies and a second pair of yoke assemblies;

the first pair of connected portion arrays are disposed apart from each other by a mechanical angle of 180 degrees relative to the direct drive shaft, and the second pair of connected portion arrays are disposed apart from each other by a mechanical angle of 180 degrees relative to the direct drive shaft and apart from the first pair of connected portion arrays by a mechanical angle of 90 degrees;

the first pair of yoke assemblies are constituted from one pair of magnetic cylindrical members that respectively connect the first pair of connected portions of the first pair of connected portion arrays;

a linear bearing is disposed in each magnetic cylindrical member in the pair;

one pair of guide shafts are slidably fitted into the one pair of magnetic cylindrical members via the linear bearings; and both ends of the direct drive shaft and both ends of the one pair of guide shafts are respectively connected to one pair of connecting members.

5. The linear synchronous motor according to claim 4, wherein the second pair of yoke assemblies are constituted from one pair of magnetic conductive parts each formed of a magnetic conductive plate with a plurality of fitting grooves formed therein, the fitting grooves being fitted with the second pair of connected portions of the second pair of connected portion arrays; and the one pair of magnetic conductive parts are mechanically connected to the stator core unit with the second pair of connected portions being fitted in the fitting grooves.

6. The linear synchronous motor according to claim 4, wherein a spring mechanism is disposed between one connecting member in the pair and the stator core unit to bias the one connecting member in a direction apart from the stator core unit when the one connecting member approaches the stator core unit.

7. The linear synchronous motor according to claim 4, wherein the linear bearing includes one pair of split linear bearings disposed apart in the axial direction of the guide shaft.

8. The linear synchronous motor according to claim 1, wherein the yoke assembly is integrally formed of a magnetic conductive material.

* * * * *